United States Patent [19]
Maeda et al.

[11] Patent Number: 4,776,683
[45] Date of Patent: Oct. 11, 1988

[54] OPTICAL IMAGING DEVICE

[75] Inventors: Ikuo Maeda; Toshiyuki Inokuchi; Takaaki Miyashita, all of Kanagawa, Japan

[73] Assignee: Ricoh Company, Ltd., Tokyo, Japan

[21] Appl. No.: 843,270

[22] Filed: Mar. 24, 1986

[30] Foreign Application Priority Data

| Mar. 25, 1985 | [JP] | Japan | 60-60360 |
| Mar. 25, 1985 | [JP] | Japan | 60-60361 |
| Mar. 25, 1985 | [JP] | Japan | 60-42934[U] |

[51] Int. Cl.$^4$ .......................... G02B 7/00; G02B 27/00
[52] U.S. Cl. .......................... 350/574; 355/66
[58] Field of Search .......................... 350/167, 319–320, 350/417, 574, 252; 355/46, 49, 51, 66

[56] References Cited

U.S. PATENT DOCUMENTS

| 1,921,918 | 8/1933 | Goodwin | 350/451 |
| 3,364,816 | 1/1968 | Jeffree | 355/51 |
| 3,606,535 | 9/1971 | Koizumi | 355/51 |
| 3,873,188 | 3/1975 | Baeker | 350/417 |
| 3,912,377 | 10/1975 | Johnson | 350/252 |
| 4,196,994 | 4/1980 | de Jesus et al. | 350/276 SL |
| 4,460,424 | 7/1984 | Buser et al. | 350/417 |
| 4,525,059 | 6/1985 | Haramaki | 355/51 |

FOREIGN PATENT DOCUMENTS

| 44416 | 3/1983 | Japan | 350/574 |
| 48015 | 3/1985 | Japan | 350/417 |
| 102612 | 6/1985 | Japan | 350/167 |
| 284045 | 1/1965 | Netherlands | 355/66 |

*Primary Examiner*—William H. Punter
*Attorney, Agent, or Firm*—Oblon, Fisher, Spivak, McClelland & Maier

[57] ABSTRACT

A casing in the form of a slender hollow structure has a slit-shaped entrance aperture defined in an upper cover thereof and a slit-shaped exit aperture defined in a lower cover thereof. The casing houses a covex roof-shaped mirror having a convex reflecting surface, a lens array, a concave roof-shaped mirror array having an array of convex reflecting surfaces, and a spacer interposed between the concave roof-shaped mirror array and the lens array to keep them spaced apart. The upper and lower covers of the casing are integrally formed with or securely coupled to the spacer. A light shield plate lies between the corner of the convex roof-shaped mirror and the lens array, and a reflecting plate is mounted on the upper cover of the casing for reflecting light from a light source to an object to be imaged. A sensor for detecting the amount of light emitted from the light source is also mounted on the casing.

16 Claims, 7 Drawing Sheets

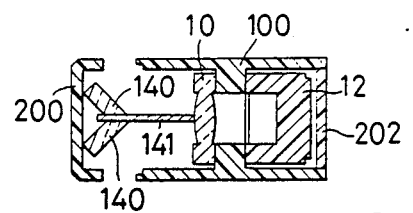
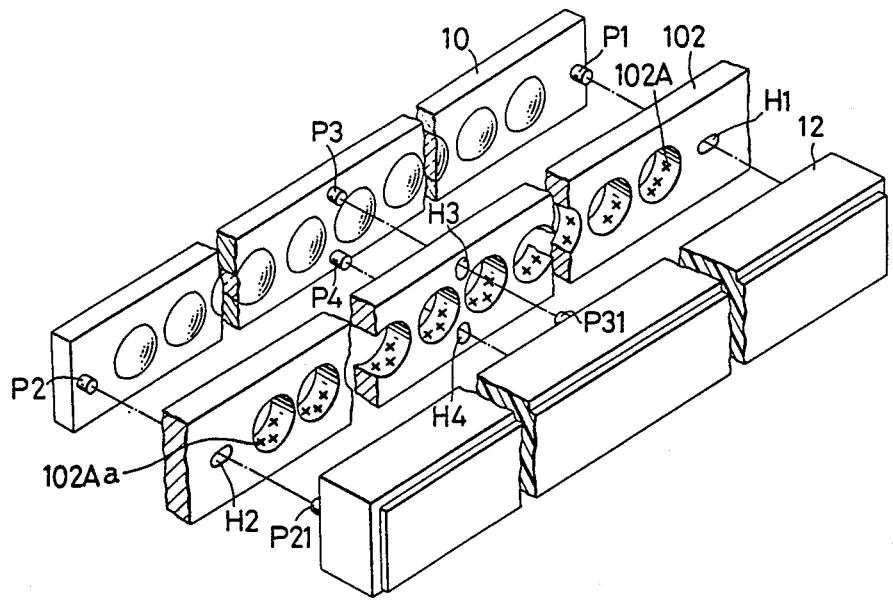
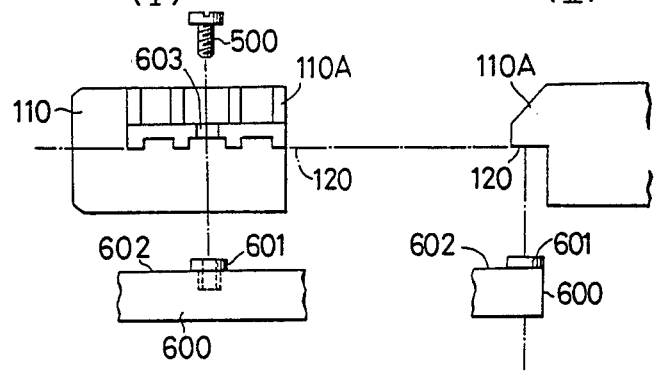
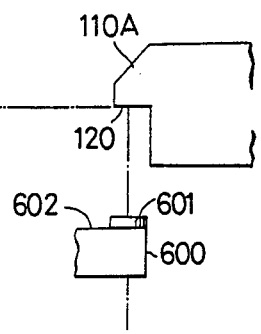

OPTICAL IMAGING DEVICE

BACKGROUND OF THE INVENTION

1. Field of the Invention

The present invention relates to an optical imaging device for optically forming images of objects.

2. Related Art

There has heretofore been known an optical imaging device comprising a convex roof-shaped mirror, a lens array, and a concave roof-shaped mirror array that are housed in a casing having entrance and exit apertures. Light from an object to be imaged is introduced through the entrance aperture of the casing, then guided successively via the convex roof-shaped mirror, the lens array, the concave roof-shaped mirror array, the lens array, and the convex roof-shaped mirror, and finally delivered out through the exit aperture to register the image of the object in a given position.

The conventional optical imaging device has a spacer interposed between the concave roof-shaped mirror array and the lens array to space them apart from each other. The spacer is in the form of a slender plate held in engagement with upper and lower covers of the casing. The spacer serves as a reference member for arranging the lens array and the concave roof-shaped mirror array in proper positional relationship to each other. The slender spacer introduces problems in that it is liable to be deformed due to warping in its longitudinal direction. When the slender spacer is deformed, the lens array and the concave roof-shaped mirror array are also caused to be deformed, resulting in a curvature of the image plane on which the combined object image is formed and hence a distortion of the formed image.

Where the optical imaging device of the prior design is incorporated in a copying machine, flare light coming from a document or original to be copied onto the photosensitive body through the optical imaging device tends to fall on an area of the photosensitive body which should not be exposed to light.

More specifically, light from the document is dispersed in every direction due to diffused reflection by the document. Some reflected light rays enter through the entrance aperture, are reflected directly by the surface of the lens array, and then directed through the exit aperture toward the photosensitive body to expose an undesirable area thereof. The unwanted exposure of the photosensitive body produces different shades on the formed image, which is then lowered in quality.

The document to be copied is illuminated by one or two illuminating light sources disposed along the entrance aperture of the casing of the optical imaging device. If two illuminating light sources are positioned along the opposite edges of entrance aperture, a sufficient amount of illuminating light can be generated, but the space for installing the illuminating light source is increased. In case only one illuminating light source is located along one edge of the entrance aperture, the light source must be of a large capacity to produce a desired amount of illuminating light, though no large installation space is necessary.

The illuminating light emitted from the light source is required to be detected and controlled at all times since the light source is apt to deteriorate by aging and there are small characteristic variations from light source to light source. For such light control, it has been customary to detect light which is not directly involved in the illumination of a document to be copied. However, an installation space and a mechanism are required for a sensor which detects the amount of illuminating light.

SUMMARY OF THE INVENTION

It is an object of the present invention to provide an optical imaging device in which a spacer interposed between a concave roof-shaped mirror array and a lens array is prevented from being deformed due to warping, thus avoiding image distortions which would otherwise be caused by deformation of the concave roof-shaped mirror array and the lens array.

To achieve above object, the spacer is integrally formed, or securely united, with upper and lower covers of a casing.

Another object of the present invention is to provide an optical imaging device capable of eliminating flare light which would otherwise reach a plane on which an image is formed.

This object can be achieved by positioning a light shield plate between a convex roof-shaped mirror and a lens array for cutting off light reflected by the lens array.

Still another object of the present invention is to provide an optical imaging device in which a sufficient amount of illuminating light is available from an illuminating light source disposed on one side of an entrance aperture of a casing and which has a sensor for detecting the amount of illuminating light, the sensor being positioned in a location selected for better space utilization.

To accomplish the above object, a reflecting plate is disposed on the upper surface of the casing for effectively guiding the illuminating light from the illuminating light source toward an object to be imaged, and the sensor is disposed in a space behind the reflecting plate.

BRIEF DESCRIPTION OF THE DRAWINGS

The above and other objects, features and advantages of the present invention will become more apparent from the following description when taken in conjunction with the accompanying drawings in which preferred embodiments of the present invention are shown by way of illustrative example.

FIG. 3 is a transverse cross-sectional view of the casing of FIG. 2 with various components housed therein;

FIG. 4 is a fragmentary exploded perspective view of the assembly shown in FIG. 3;

FIG. 5 is a view explanatory of the manner in which the optical imaging device is installed in place;

DESCRIPTION OF THE PREFERRED EMBODIMENTS

An optical imaging device according to the present invention is intended for use in an optical system for forming erect images of the same size as that of imaged objects. an exposure optical system in electronic copying machines, an optical system for reading documents in facsimile transmitters, and the like.

Figure 1:
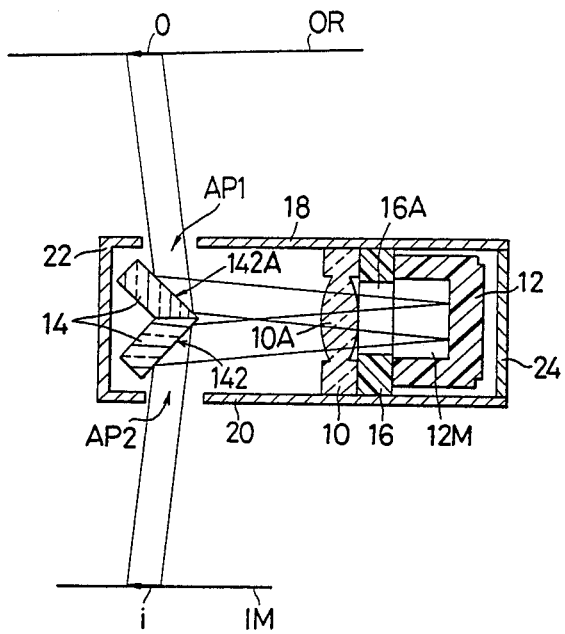
FIG. 1 is a transverse cross-sectional view of an optical imaging device according to an embodiment of the present invention.

FIG. 1 shows, in transverse cross section, an optical imaging device according to an embodiment of the present invention. The optical imaging device has a longitudinal direction normal to the sheet of FIG. 1, a vertical direction parallel to the vertical direction in FIG. 1, and a transverse direction parallel to the horizontal direction in FIG. 1 (the front and rear sides of the optical imaging device are shown on the lefthand and righthand sides, respectively, in FIG. 1).

The optical imaging device includes a lens array 10 comprising an array of small-size lenses 10A disposed at a constant pitch or interval in the longitudinal direction. The lens array 10 is of a unitary structure which may be molded of plastics, for example.

The optical imaging device also includes a concave roof-shaped mirror array 12 comprising an array of concave roof-shaped mirrors each formed of planar mirrors arranged in the longitudinal direction, each mirror having two mirror surfaces combined into a concave mirror surface. One of the mirror surfaces is denoted at 12M. The concave roof-shaped mirrors are arrayed at the same pitch or interval as that of the lens array 10. The individual lenses of the lens array 10 and the concave roof-shaped mirrors of the mirror array 12 are positioned in one-to-one correspondence. Each of the lenses of the lens array 10 and the corresponding concave roof-shaped mirror jointly constitute a unit imaging element. Therefore, the lens array 10 and the concave roof-shaped mirror array 12 together serve as an array of imaging elements. The concave roof-shaped mirror array 12 may be molded of plastics, for example, with the mirror surfaces being deposited as evaporated layers of aluminum, for example.

A spacer 16 is in the form of a slender plate having a plurality of light path holes 16A spaced at the same constant interval or pitch in the longitudinal direction as that of the lenses of the lens array 10, i.e., the imaging elements. The light path holes 16A are defined through the spacer 16 in a horizontally transverse direction which corresponds to the transverse direction of the optical imaging device. The spacer 16 extends in a longitudinal direction corresponding to the longitudinal direction of the optical imaging device, and has a vertically transverse direction which is normal to the longitudinal and horizontally transverse directions thereof.

The spacer 16 has one vertical surface held against the lens array 10 throughout its length in the longitudinal direction and the opposite vertical surface held against the concave roof-shaped mirror array 12 throughout its length in the longitudinal direction. The spacer 16 serves three purposes as follows: The spacer 16 serves as a positional reference for the lens array 10 and the concave roof-shaped mirror array 12. The spacer 16 keeps the lens array 10 and the concave roof-shaped mirror array 12 horizontally spaced by a distance from each other. The spacer 16 separates the optical paths of the individual imaging elements from each other.

The optical imaging device further includes a convex roof-shaped mirror 14 composed of two planar mirror surfaces, 142 142A extending in the longitudinal direction and joined perpendicularly to each other to form an entire convex mirror surface.

The lens array 10, the concave roof-shaped mirror array 12, the spacer 16, and the convex roof-shaped mirror 14 are accommodated in a casing comprising an upper cover 18, a lower cover 20, a front cover 22, and a rear cover 24. The upper and lower covers 18, 20 are disposed on the vertically transverse edges of the spacer 16 in confronting relation to each other and in sandwiching relation to the lens array 10 and the concave roof-shaped mirror array 12. The space 16 and the upper and lower covers 18, 20 are integrally molded of synthetic resin. The upper cover 18, the lower cover 20, the front cover 22, and the rear cover 24 jointly constitute an elongate hollow body of a rectangular cross section. The casing also has end covers at its longitudinal ends, respectively, the end covers being integral with the spacer 16 and closing the longitudinal open ends of the elongate hollow body. The upper cover 18 has an entrance aperture AP1 opening toward an object to be imaged, and the lower cover 20 has an exit aperture AP2 opening toward an image to be formed.

Rays of light coming from a portion O of an object or original OR to be imaged enter the optical imaging device through the entrance aperture AP1 and then are reflected by the mirror surface 142A of the convex roof-shaped mirror 14. The light rays reflected by the mirror surface 142A pass through the lens array 10 and are reflected by the concave roof-shaped mirror array 12 so as to pass through the lens array 10 again. Thereafter, the light rays are reflected by the mirror surface 142 and travel through the exit aperture AP2 to form an erect image i of the portion O of the original OR on an image plane IM, the erect image i being of the same size as that of the portion O. The image i is a combination of the images formed by the imaging elements.

The components described above of the optical imaging device will be described below in greater detail.

Figure 2:
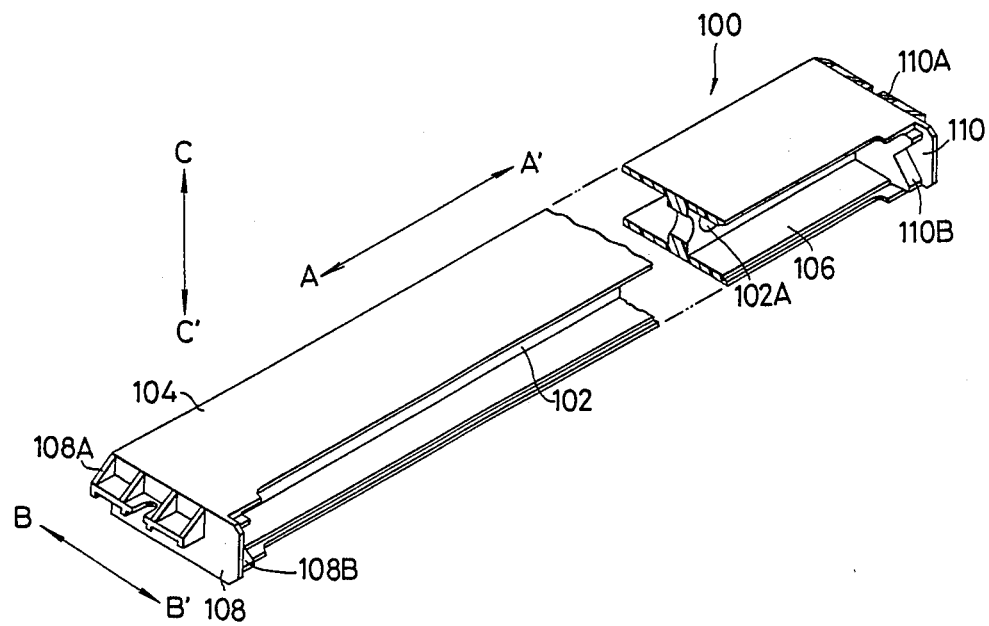
FIG. 2 is a fragmentary perspective view of a casing of the optical imaging device shown in FIG. 1.

The casing is generally designated by the reference numeral 100 in FIG. 2. The casing 100 is of an elongate configuration as a whole and has a longitudinal direction parallel to the direction of the arrows A, A', a horizontal direction parallel to the direction of the arrows B, B', and a vertical direction parallel to the direction of the arrows C, C'.

The casing 100 is constructed of four members, i.e., a spacer 102, an upper cover 104, a lower cover 106, and end covers 108, 110 at the longitudinal ends thereof. The spacer 102 has an array of light path holes 102A spaced in the direction of the arrows A, A', i.e., the longitudinal direction of the casing 100, the light path holes 102A being spaced at a constant pitch equal to the pitch of the lenses of the lens array 10. The light path holes 102A extend through the spacer 102 in the direction of the arrows B, B', i.e., the horizontal direction of the casing 100. Therefore, the horizontally transverse direction of the spacer 102 corresponds to the horizontal direction of the casing 100, and the vertical direction of the casing 100 corresponds to the vertically transverse direction of the spacer 102. The casing 100 is of a unitary structure molded of synthetic resin such as plastics, for example.

The upper and lower covers 104, 106 are in the form of slender or elongate plates which are integral with the spacer 102 at its opposite edges in the vertically transverse direction thereof. The horizontally transverse direction of the spacer 102 is normal to the upper and lower covers 104, 106.

Therefore, the casing 100 has a transverse cross-sectional shape of an I beam, which is structurally strong against bending or deformation in any directions perpendicular to the longitudinal direction thereof.

The end covers 108, 110 have attachments 108A, 110A, respectively, on their outer surfaces, and V-shaped grooves 108B, 110B, respectively, in their inner surfaces. The attachments 108A, 110A serve to install the casing 100 and hence the optical imaging device in a desired apparatus such as a copying machine. The V-shaped grooves 108B, 110B serve to position the convex roof-shaped mirror 14. These attachments 108A, 110A and the V-shaped grooves 108B, 110B will be described later on.

The upper and lower covers 104, 106 have their front edges (facing in the direction of the arrow B') cut off along a straight line to define entrance and exit apertures opening respectively toward an object to be imaged and an image to be formed.

FIG. 3 illustrates, in transverse cross section, the casing 100 with various components accommodated therein. More specifically, the casing 100 houses the lens array 10 and the concave roof-shaped mirror array 12, as shown in FIG. 1, and also houses a convex roof-shaped mirror 140 and a light shield plate 141. The casing 100 further includes a front cover 200 and a rear cover 202.

Figure 11:
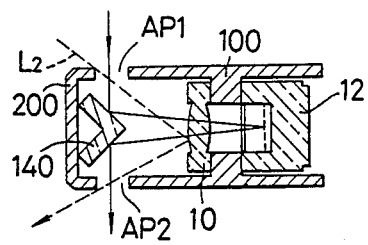
FIG. 11 is a transverse cross-sectional view illustrative of the manner in which flare light would be produced of no light shield plate were employed.

The light shield plate 141 comprises a longitudinally elongate rectangular plate. Light which falls through the entrance aperture directly on the lens array 10 without passing through being reflected by the convex roof-shaped mirror 140 or which is reflected by only one surface of the convex roof-shaped mirror 140, is prevented by the light shield plate 141 from entering the exit aperture as stray light (FIG. 11). The light shield plate 141 has one longitudinal edge held against the lens array 10. The details of the light shield plate 141 will be described later.

The lens array 10 and the concave roof-shaped mirror array 12 are held against the horizontally opposite surfaces of the spacer of the casing 100. The lens array 10 and the concave roof-shaped mirror array 12 may be joined to the spacer in various ways, one example being adhesive bonding. In the embodiment shown in FIG. 3, however, the lens array 10 and the concave roof-shaped mirror array 12 are coupled to the spacer in the following manner:

In FIG. 4, the spacer 102 is shown as an elongate plate separated from the upper and lower covers. The space 102 has longitudinally oblong holes H1, H2 defined respectively in its longitudinal end portions and vertically transversely oblong holes H3, H4 defined in the central portions of its vertically transverse edges. These oblong holes H1, H2, H3, H4 may extend through the spacer 102 in the horizontally transverse direction thereof, or be defined individually in the opposite surfaces in the horizontally transverse direction thereof.

The lens array 10 has pins P1, P2, P3, P4 on one surface thereof which will engage in the oblong holes H1, H2, H3, H4, respectively. The concave roof-shaped mirror array 12 also has pins P21, P31 for engagement in the oblong holes H1, H2, H3, H4, respectively. These pins can move in the longitudinal direction of the oblong holes, but cannot move in the transverse direction of the oblong holes.

By engaging the pins P1, P2, P3, P4, P21, P31 in the oblong holes H1, H2, H3, H4, the lens array 10 and the concave roof-shaped mirror array 12 can easily be coupled to the spacer 102 in proper positional relationship without being tilted relatively to each other. Since the pins can move longitudinally in the oblong holes, the lens array 10, the mirror array 12, and the spacer 102 will not be subjected to undue stresses even if they are deformed due to elongation and contraction in the longitudinal and vertically transverse directions which arise from changes in the ambient temperature. The pins may instead be disposed on the spacer 102, and the oblong holes may instead be defined in the lens array 10 and the mirror array 12.

The inner wall surfaces of the light path holes 102A of the spacer 102 should not reflect light, to prevent stray light from being produced. To this end, the inner wall surfaces of the light path holes 102A may be treated to prevent light reflection. A more inexpensive way, however, is by embossing extending the inner wall surfaces of the light path holes 102A, with preferable embossing tools being numbered KN-1507, KN-1503, or the like. The embossed inner wall surfaces of the light path holes 102A are roughened to improve their light absorbing and diffusing capabilities for effective prevention of light reflection.

Attachment of the optical imaging device will be described with reference to FIG. 5.

Since the optical imaging device forms images of objects with no size enlargement or reduction, the centers of the imaging elements are required to be aligned with the centers of the optical paths for better image formation. Stated otherwise, the plane with respect to which the optical imaging device is vertically symmetrical is required to be positioned at the center of the optical distance between the object and the image. The plane with respect to which the optical imaging device is symmetrical vertically is the same as a plane shared by the optical axes of the lenses of the lens array 10. With the above requirement met, it is also required that the longitudinal direction of the optical imaging device be parallel to the longitudinal direction of a tubular light source lamp which illuminates the object to be imaged, otherwise the brightness of the formed image would not be uniform in the longitudinal direction.

The position in which the optical imaging device is to be installed is determined as a design condition dependent on the apparatus such as a copying machine in which the optical imaging device is to be incorporated. Therefore, the simplest way of assembling the optical imaging device efficiently and positionally accurately in the desired apparatus is to determine a reference assembling position in the apparatus, to provide the optical imaging device with a certain attachment reference for cooperation with the reference assembling position, and to attach the optical imaging device so that the attachment reference will be aligned with the reference assembling position.

FIG. 5 shows an attachment member 600 in the apparatus such as a copying machine in which the optical imaging device is to be incorporated. The attachment member 600 has an upper surface 602 lying at the center of the optical distance between an object plane (i.e., the surface on which an original to be copied is placed) and an image plane (i.e., the surface of a photosensitive body).

The attachments 108A, 110A on the longitudinally end covers 108, 110 of the casing 100 are of the same configuration. Therefore, only the attachment 110A will be described with reference to FIG. 5. FIG. 5 shows at (II) the rear side of the end of the casing 100 in the direction of the arrow A'. The attachment 110A has a lower surface 120 serving as a reference attachment surface lying at the plane with respect to which the optical imaging device is vertically symmetrical. The optical imaging device can automatically be assembled in proper place in the apparatus by holding the reference attachment surface 120 against the upper surface 602 of the attachment member 600, and threading a screw 500 through a hole 603 in the attachment 110A into a screw engagement portion 601 of the attachment member 600 to thereby fix the casing 100 to the attachment member 600. The above assembling procedure is advantageous in that a small twist in the casing 100 about its longitudinal direction can be eliminated automatically by securing the attachment 110A to the attachment member 600 with the screw 500.

Positioning of the convex roof-shaped mirror 140 with the V-shaped grooves will be described below with reference to FIG. 6. For better image formation, the accuracy of the mutual positional relationship between the image element array and the convex roof-shaped mirror 140 is quite important. It would be highly complex to assemble and adjust the optical imaging device if the convex roof-shaped mirror 140 were mounted on the front cover 22 (FIG. 1) and then positionally adjusted with respect to the lens array 10 and the concave roof-shaped mirror array 12.

Figure 6:
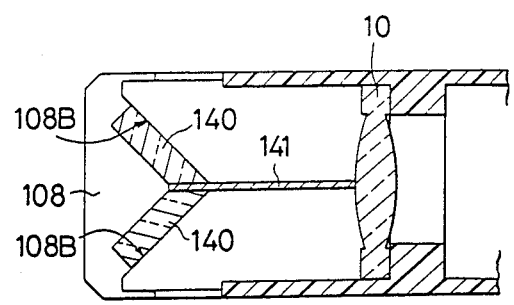
FIG. 6 is a fragmentary transverse cross-sectional view illustrating how a convex roof-shaped mirror is positioned.

In the arrangement shown in FIG. 6, the longitudinal ends of the convex roof-shaped mirror 140 are placed in the V-shaped grooves 108B, 110B (only the V-shaped groove 108B is shown in FIG. 6) and held against the bottom walls of groove 108B for positioning the convex roof-shaped mirror 140. Therefore, the lens array 10, the concave roof-shaped mirror array 12, and the convex roof-shaped mirror 140 can easily be combined in proper relative positions inasmuch as they are relatively positioned with respect to the casing 100. The spacer is shown as integral with the upper and lower covers of the casing.

Other embodiments or modifications of the present invention will be described below. Those parts in the other embodiments or modifications which are identical to those in the preceding embodiment are denoted by identical reference characters.

Figure 7:
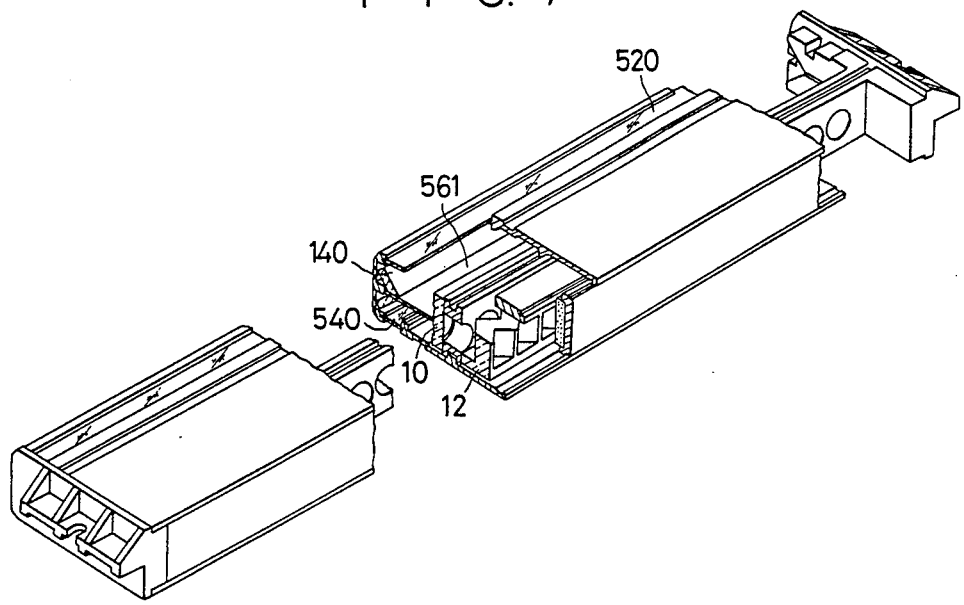
FIG. 7 is a fragmentary perspective view of an optical imaging device according to another embodiment of the present invention.
Figure 8:
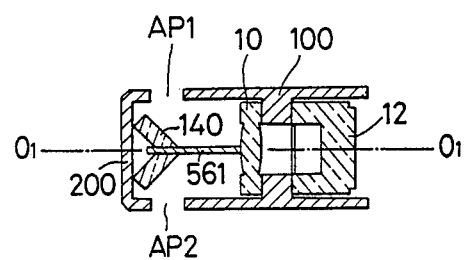
FIG. 8 is a transverse cross-sectional view of the optical imaging device of FIG. 7.
Figure 9:
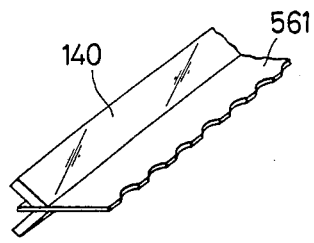
FIG. 9 is a fragmentary perspective view of a light shield plate.
Figure 10:
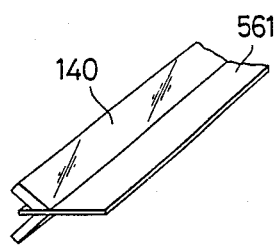
FIG. 10 is a fragmentary perspective view of another light shield plate.

As shown in FIGS. 7 and 8, an elongate transparent member 520 is disposed on the casing 100 in and along the entrance aperture AP1, and an elongate transparent member 540 is disposed on the casing 100 in and along the exit aperture AP2. A light shield plate 561 made of light-shielding metal or synthetic resin extends horizontally on the optical axis 01-01 of the lens array 10 and between the convex roof-shaped mirror 140 and the lens array 10. The light shield plate 561 has one edge extending through the central corner of the convex roof-shaped mirror 140 where the two mirror surfaces are joined to each other, and the other edge held against or close to the surface of the lens array 10.

Where the other edge of the light shield plate 561 is held against the lens array 10, it may be of a wavy configuration complementary to the convex surfaces of the lenses of the lens array 10, as shown in FIG. 9, or may be shaped as a straight edge, as illustrated in FIG. 10, which is held uniformly against the convex surfaces of the lenses of the lens array 10.

The structure of FIGS. 7 and 8 is advantageous in that flare light which would pass through the optical imaging device as shown in FIG. 11 can be prevented by the light shield plate 561 (FIGS. 7 and 8) from reaching the image plane or the photosensitive surface. Therefore, the produced image is not disturbed by the undesirable flare light.

Figure 12:
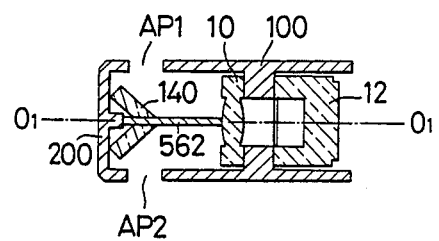
FIG. 12 is a transverse cross-sectional view of an optical imaging device according to a modification.

FIG. 12 shows an optical imaging device according to a modification. The optical device of FIG. 12 includes a light shield plate 562 which is functionally the same as the light shield plate 561 shown in FIGS. 7 and 8. However, the light shield plate 562 has an edge extending beyond the convex roof-shaped mirror 140 and held against and bonded to the front cover 200. The convex roof-shaped mirror 140 on the light shield plate 562 is therefore stably supported in position. Where the light shield plate 562 is made of a transparent material, its surfaces are treated to act as diffusing surfaces or colored with a black painting compound.

Figure 13:
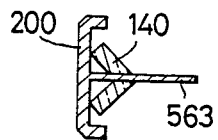
FIG. 13 is a transverse cross-sectional view of a light shield plate and a front cover in another modified optical imaging plate.

FIG. 13 illustrates still another modified light shield plate 563 which is molded integrally with the front cover 200. The light shield plate 563 and the front cover 200 may be separate from the other casing members, and may subsequently be assembled therewith.

Figure 14:
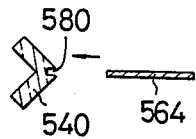
FIG. 14 is a transverse cross-sectional view of a light shield plate and a convex roof-shaped mirror according to a still further modification.

According to a still further modification shown in FIG. 14, a light shield plate 564 has one edge fitted in a groove 580 defined in a convex roof-shaped mirror 540 at its central corner. The light shield plate 564 can stably be supported on the convex roof-shaped mirror 540, and also can easily be combined with or separated from the convex roof-shaped mirror 540.

Figure 15:
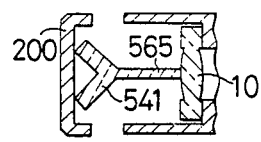
FIGS. 15 and 23 are fragmentary transverse cross-sectional views of a light shield plate, a convex roof-shaped mirror, and a lens array which are housed in a casing according to other modifications.
Figure 23:
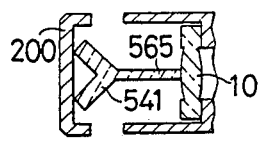

FIG. 15 shows another modified arrangement in which a convex roof-shaped mirror 541 and a light shield plate 565 are integrally formed. They may also be integrally formed with the lens array 10 (FIG. 23).

Figure 16:
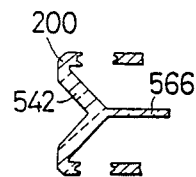
FIG. 16 is a fragmentary transverse cross-sectional view of a convex roof-shaped mirror and a light shield plate according to still another modification.

In still another modified structure shown in FIG. 16, a convex roof-shaped mirror 542 and a light shield plate 566 are integrally formed with the front cover 200. The lens array 10 may also be integrally formed with them. The front cover 200 is partly constructed by the convex roof-shaped mirror 542, so that the weight of the overall assembly can be reduced.

According to the aforesaid modifications, different components are integrally formed with each other, or can be securely joined to each other in advance, with the consequence that the number of adjustment steps required and the number of parts required can be lowered.

The light shield plate in each of the above embodiments or modifications is made of a light absorbing material or a light diffusing material, or colored with a black printing compound. Therefore, the light shield plate prevents flare light from being produced by reflection of stray light from the front surface of the lens array 10.

Flare light which would produce adverse effects on images formed on the photosensitive body can also be generated by reflection of light from the rear surface of the lens array 10.

Figure 17:
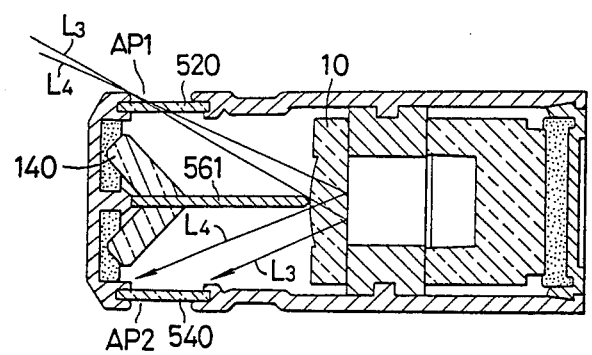
FIG. 17 is a transverse cross-sectional view showing the manner in which flare light is prevented by the configuration of an entrance aperture.

As shown in FIG. 17, light L3 reflected from the document to be copied enters the lens array 10 beyond the distal edge of the light shield plate 561 and is reflected by the rear surface of the lens array 10. However, the light L3 does not become flare light since it is then directed to hit the casing without passing through the exit aperture AP2. Light L4 entering the lens array 10 at a smaller angle than the light L3 is reflected by the rear surface of the lens array 10 and directed beyond the distal edge of the light shield plate 561. Since the light L4 reaches the casing beyond the edge of the exit aperture AP2, the light L4 does not act as flare light either.

However, any light rays coming between the light rays L3, L4 are reflected by the rear surface of the lens array 10 toward the exit aperture AP2 and pass through the transparent plate 540 to reach the photosensitive body, registering flare spots thereon. To avoid such flare light reflected by the rear surface of the lens array 10, the entrance aperture AP1 is shaped such that a line passing through upper and lower edges of the entrance aperture AP1 toward the lens array 10 is intersected by the light shield plate inwardly of the distal edge thereof.

Figure 18:
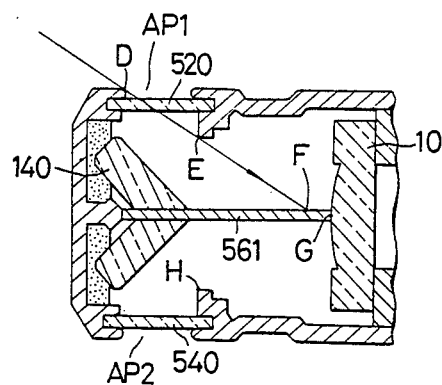
FIGS. 18 and 24 are transverse cross-sectional views showing two ways in which flare light is prevented by the configuration of an exit aperture.

More specifically, as shown in FIG. 18, the line passing through the upper and lower edges, designated at D, E, respectively, of the entrance aperture AP1 reaches the light shield plate 561 at a point F that is positioned inwardly of the distal edge G thereof. The upper edge D is closer to the convex roof-shaped mirror 140 than the lower edge E, which is closer to the lens array 10 than the upper edge D, when measured in the direction of the optical axis of the lens array 10. That is, no more than two of the group consisting of the upper and lower edges D and E, and the edge G, are arranged on a single straight line, and the remainder of the elements D, E and G project beyond the straight line. Therefore, light entering along the line is cut off by the light shield plate 561. The lower edge E is of an increased height to achieve reliable prevention of flare light.

Figure 24:
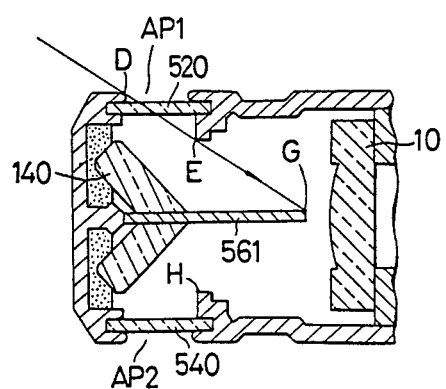

The critical condition such that light coming from the entrance aperture AP1 directly toward the rear surface of the lens array 10 can be cut off can be accomplished by the arrangement of the upper edge D, the lower edge E, and the distal edge G along a straight line (FIG. 24). Therefore, by placing these points D, E, G on a straight line, or positioning at least one of these points D, E, G so as to project across such a straight line with the other points remaining on the straight line, light that would otherwise reach the rear surface of the lens array 10 can effectively be cut off by the light shield plate.

The above requirements for the critical condition may be eliminated or such flare light formed by secondary or higher-degree reflected light can effectively be prevented by increasing the height of the upper edge H of the exit aperture AP2 as shown in FIG. 18, the upper edge H being closer to the lens array 10 than the other edge of the exit aperture AP2.

As shown in FIG. 17, the spacer is connected to the upper and lower covers of the casing through interfitting engagement between ridges on the upper and lower covers and grooves in the spacer.

Figure 19:
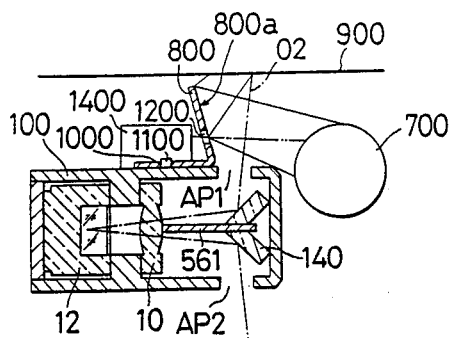
FIG. 19 is a transverse cross-sectional view of an optical imaging device including a counter reflecting plate according to still another embodiment.
Figure 20:
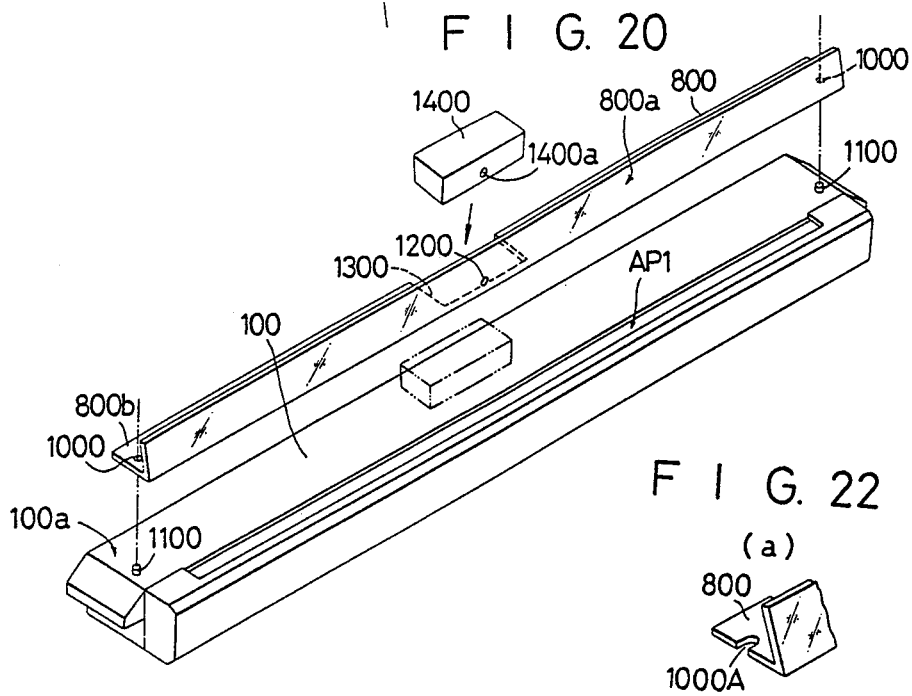
FIG. 20 is an exploded perspective view of the optical imaging device shown in FIG. 19.

According to still another embodiment shown in FIGS. 19 and 20, an illuminating light source 700 comprising a fluorescent lamp, for example, is disposed along one side edge of the entrance aperture AP1 of the casing 100. An elongate counter reflecting plate 800 of a substantially L-shaped cross section is mounted on the upper surface 100a of the casing 100 along the opposite side edge of the entrance aperture AP1. In operation, the illuminating light source 700 illuminates an original or document 900 to be copied, and the optical image of the original 900 is formed as a slit on an image plane such as the surface of a photosensitive body by light travelling along an optical axis O2 through the entrance aperture AP1, the convex roof-shaped mirror 140, the lens array 10, the concave roof-shaped mirror array 12, the lens mirror 10, the convex roof-shaped mirror 140, and the exit aperture AP2.

The amount of light emitted from the illuminating light source 700 to illuminate the original 900 is maximum in an area directly above the illuminating light source 700 on the righthand side of the optical axis O2. The counter reflecting plate 800 has its reflecting surface 800a inclined to form the mirror image of the illuminating light source 700 for reflecting part of the illuminating light from the light source 700 toward an area on the lefthand side of the optical axis O2. Therefore, the entire areas on the opposite sides of the optical axis O2 are illuminated by the light emitted directly from the illuminating light source and the light reflected by the counter reflecting plate 800.

As shown in FIG. 20, the counter reflecting plate 800 has holes 1000 defined in the opposite longitudinal ends of an attachment portion 800b thereof as reference attachment means. The casing 100 has integral positioning pins 1100 disposed on its upper surface 100a as companion reference attachment means. The holes 1000 are positioned in a prescribed positional relation to the reflecting surface 800a, and the positioning pins 1100 are positioned in a prescribed positional relation to the entrance aperture AP1. In assembly, the positioning pins 1100 are fitted respectively in the holes 1000 to position the counter reflecting plate 800 accurately with respect to the casing 100 without any positional adjustment. After the positioning pins 1100 have been placed in the holes 1000, respectively, the casing 100 and the counter reflecting plate 800 are fastened to each other by suitable fasteners such as double-sided adhesive tapes or self-tapping screws.

Figure 22:
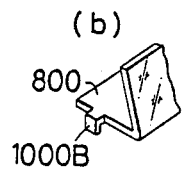
FIGS. 22(a) through 22(c) are fragmentary perspective views of other reference attachment means on counter reflecting plates.
Figure 22:
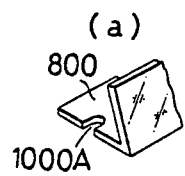
Figure 22:
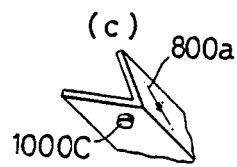

The counter reflecting plate 800 may have recesses 1000A (FIG. 22(a)) defined in its longitudinal ends instead of the holes 1000 of FIG. 20, and the positioning pins 1100 may engage in such recesses 1000A for positioning purpose.

Figure 21:
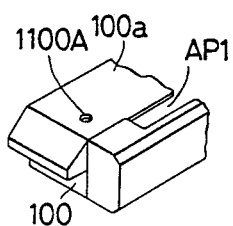
FIG. 21 is a fragmentary perspective view of another reference attachment means on a casing.

Each of the reference attachment means on the upper surface 100a of the casing 100 may comprise a positioning hole or recess 1100A as shown in FIG. 21. Each of the reference attachment means on the counter reflecting surface 800 may comprise a bent projection 1000B as shown in FIG. 22(b) or a partly pressed projection 1000C as shown in FIG. 22(c) for engagement in the hole or recess 1100A of FIG. 21.

The counter reflecting plate 800 shown in FIG. 20 has a small hole 1200 defined in the reflecting surface 800a centrally in its longitudinal direction. The small hole 1200 is positioned in an area of the reflecting surface 800a which is vertically transversely displaced (FIG. 19) for reflecting light closely to the optical axis O2.

The attachment portion 800b of the counter reflecting plate 800 has a rectangular recess 1300 in its longitudinally central area. A sensor 1400 for detecting the amount of light emitted from the illuminating light source 700 is positioned in the recess 1300, the sensor 1400 having a light admission window 1400a opening toward the small hole 1200 in registration therewith. In response to a detected signal from the sensor 1400, a voltage control device (not shown) controls the amount of light emitted from the illuminating light source 700. The sensor 1400 is fastened to the upper surface 100a of the casing 100 by suitable fasteners such as a double-sided adhesive tape. The positions of the small hole 1200 and the recess 1300 are selected dependent on the shape and size of the sensor 1400 used and the position of the light admission window 1400a. The position of the small hole 1200 in the longitudinal direction of the counter reflecting plate 800 and the position of the sensor 1400 dependent on the position of the small hole 1200 are not limited to the illustrated positions, but may be selected for the convenience of laying wires connected to the sensor 1400 behind the counter reflecting plate 800.

Although certain preferred embodiments have been shown and described, it should be understood that many changes and modifications may be made therein without departing from the scope of the appended claims.

What is claimed is:

1. An optical image device comprising:
   a casing including an upper cover having an entrance aperture defined therein which has upper and lower edges, a lower cover having an exit aperture defined therein;
   an optical system disposed in said casing and having a convex roof-shaped mirror having two reflecting surfaces joined to each other to form a corner, a lens array, a spacer interposed between said upper and lower covers and securely united therewith, and a roof-shaped mirror array, said optical system being arranged in said casing such that light from an object to be imaged and entering through said entrance aperture is successively reflected by said roof-shaped mirror, passes through said lens array and said spacer, is reflected by said roof-shaped mirror array, passes through said lens array, is reflected by said roof-shaped mirror in the order named, and is finally emitted through said exit aperture to form an image of the object at a position outside of said casing; and
   a light shield plate extending on an optical axis of said lens array between said roof-shaped mirror and said lens array, and having one edge extending through said corner of said convex roof-shaped mirror and another edge held close to a surface of said lens array
   wherein said upper edge is closer to said roof-shaped mirror than is said lower edge, and said lower edge is closer to said lens array than is said upper edge when measured along said optical axis, said another edge of said light shield plate being closer to said lens array than is said lower edge, wherein no more than two of the elements of the group of said upper and lower edges and said another edge of the light shield plate are arranged on a single straight line, and the remainder of said elements of said group project beyond said straight line.

2. An optical imaging device comprising:
   a casing including an upper cover having an entrance aperture defined therein which has upper and lower edges, a lower cover having an exit aperture defined therein;
   an optical system disposed in said casing and having a roof-shaped mirror having two reflecting surfaces joined to each other to form a corner, a lens array, a spacer interposed between said upper and lower covers and securely united therewith, and a roof-shaped mirror array, said optical system being arranged in said casing such that light from an object to be imaged and entering through said entrance aperture is successively reflected by said roof-shaped mirror, passes through said lens array and said spacer, is reflected by said roof-shaped mirror array, passes through said lens array, is reflected by said roof-shaped mirror in the order named, and is finally emitted through said exit aperture to form an image of the object at a position outside of said casing; and
   a light shield plate extending on an optical axis of said lens array between said roof-shaped mirror and said lens array, and having one edge extending through said corner of said convex roof-shaped mirror and another edge held close to a surface of said lens array;
   wherein said upper edge is closer to said roof-shaped mirror than is said lower edge, and said lower edge is closer to said lens array than is said upper edge when measured along said optical axis, said another edge of said light shield plate being closer to said lens array than is said lower edge, and wherein said upper and lower edges and said another edge of the light shield plate are arranged on a single straight line.

3. An optical imaging device according to claim 1, wherein said light shield plate comprises a light-shielding plate of metal.

4. An optical imaging device according to claim 1, wherein said light shield plate comprises a light-shielding plate of synthetic resin.

5. An optical imaging device according to claim 1, wherein said light shield plate comprises a light-shielding plate of a transparent material having surfaces treated to form light-shielding surfaces.

6. An optical imaging device according to claim 1, wherein said surface of said lens array comprises an array of convex lens surfaces, said another edge of the light shield plate being of a wavy configuration complementary to said convex lens surfaces.

7. An optical imaging device according to claim 1, wherein said surface of said lens array comprises an array of convex lens surfaces, said another edge of the light shield plate being of a straight configuration held uniformly close to said surface of said lens array.

8. An optical imaging device according to claim 1, wherein said one edge of the light shield plate is held against and bonded to said casing.

9. An optical imaging device according to claim 1, wherein said one edge of the light shield plate is integral with said casing.

10. An optical imaging device according to claim 9, wherein said casing includes one portion integral with said light shield plate and another portion separate from and combinable with said one portion.

11. An optical imaging device according to claim 1, wherein said corner has a groove, said one end of the light shield plate being fitted in said groove.

12. An optical imaging device according to claim 1, wherein said one edge of the light shield plate is joined to said corner integrally with said convex roof-shaped mirror.

13. An optical imaging device according to claim 12, wherein said convex roof-shaped mirror is integral with said casing.

14. An optical imaging device according to claim 13, wherein said light shield plate has another edge integral with said lens array.

15. An optical imaging device according to claim 1, wherein said exit aperture has an upper edge having such a height as to cut off light reflected from said lens array.

16. An optical imaging device according to claim 15, wherein said upper edge is closer to said lens array when measured along said optical axis.

* * * * *